(12) United States Patent
Saito et al.

(10) Patent No.: US 11,327,561 B1
(45) Date of Patent: May 10, 2022

(54) DISPLAY SYSTEM

(71) Applicant: Apple Inc., Cupertino, CA (US)

(72) Inventors: Kenichi Saito, Cupertino, CA (US); Yoshikazu Shinohara, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/584,690

(22) Filed: Sep. 26, 2019

Related U.S. Application Data

(60) Provisional application No. 62/737,828, filed on Sep. 27, 2018.

(51) Int. Cl.
| | |
|---|---|
| *G06F 3/00* | (2006.01) |
| *G06F 3/01* | (2006.01) |
| *G06T 7/20* | (2017.01) |
| *G02B 27/28* | (2006.01) |
| *G02B 27/00* | (2006.01) |
| *H04N 5/247* | (2006.01) |
| *H04N 5/225* | (2006.01) |

(52) U.S. Cl.
CPC ......... *G06F 3/013* (2013.01); *G02B 27/0093* (2013.01); *G02B 27/288* (2013.01); *G06T 7/20* (2013.01); *G06T 2207/10048* (2013.01); *G06T 2207/30201* (2013.01); *H04N 5/2256* (2013.01); *H04N 5/247* (2013.01)

(58) Field of Classification Search
CPC .. G06F 3/01; H04N 9/31; B60K 35/00; G02B 27/01; G02B 27/22
See application file for complete search history.

(56) References Cited

U.S. PATENT DOCUMENTS

| | | | |
|---|---|---|---|
| 9,625,723 B2 | 4/2017 | Lou et al. | |
| 9,835,777 B2 | 12/2017 | Ouderkirk et al. | |
| 10,007,118 B2 | 6/2018 | Border | |
| 2014/0327603 A1* | 11/2014 | Hiraide | G02B 27/0172 345/8 |
| 2014/0361977 A1* | 12/2014 | Stafford | G06F 3/013 345/156 |
| 2017/0059869 A1* | 3/2017 | Lee | G02B 27/0172 |
| 2017/0147859 A1 | 5/2017 | Zhang et al. | |
| 2017/0242249 A1* | 8/2017 | Wall | G02B 6/0016 |
| 2017/0359558 A1* | 12/2017 | Harada | H04N 9/3108 |
| 2018/0239146 A1* | 8/2018 | Bierhuizen | G02B 27/0093 |
| 2019/0285905 A1* | 9/2019 | Tam | G02B 17/004 |
| 2021/0055560 A1* | 2/2021 | Ben Tez | G02B 27/0172 |

* cited by examiner

*Primary Examiner* — Michael A Faragalla
(74) *Attorney, Agent, or Firm* — Robert C. Kowert; Kowert, Hood, Munyon, Rankin & Goetzel, P.C.

(57) ABSTRACT

An apparatus for image viewing and eye tracking in virtual or mixed reality systems that includes two or more display panels (e.g., a top display panel and a bottom display panel) for each eye with left and right prisms located between the display panels and the user's eyes. S- and P-polarizing filters are located between the display panels and first and second surfaces of the prism. For each eye, the polarized light from the top and bottom display panels is redirected by a respective prism to form exit pupils for top and bottom images at a plane at or near the eye. At least one eye-tracking camera is located in front of each prism and between the top and bottom display panels so that the cameras have a direct or near-direct view of the user's eyes through the eyepieces.

22 Claims, 9 Drawing Sheets

DISPLAY SYSTEM

PRIORITY INFORMATION

This application claims benefit of priority of U.S. Provisional Application Ser. No. 62/737,828, filed Sep. 27, 2018, the content of which is incorporated by reference herein in its entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) combines computer generated information (referred to as virtual content) with real world images or a real world view to augment, or add content to, a user's view of the world. The simulated environments of VR and/or the mixed environments of MR may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

An eye tracker is a device for estimating eye positions and eye movement. Eye tracking systems have been used in research on the visual system, in psychology, psycholinguistics, marketing, and as input devices for human-computer interaction. In the latter application, typically the intersection of a person's point of gaze with a desktop monitor is considered.

SUMMARY

Various embodiments of methods and apparatus for image viewing and eye tracking in virtual and mixed or augmented reality (VR/AR) applications are described. A VR/AR device such as a headset, helmet, goggles, or glasses (referred to herein as a head-mounted display (HMD)) is described that includes display panels for displaying frames including left and right images in front of a user's eyes to thus provide 3D virtual views to the user. The HMD may include left and right optical prisms (also referred to herein as eyepieces) located between the displays and the user's eyes. The displays and eyepieces are configured to form virtual images of the top and bottom image content displayed on the displays at a plane in front of the user (typically, 1-2 meters in front of the user). The display images are projected onto the user's retinas by the eyepieces. The exit pupils (the point at which chief rays cross) of the eyepieces are formed at the pupil plane.

Embodiments may include two or more display panels (e.g., a top display panel and a bottom display panel) for each eye. Each eyepiece may be a prism with three surfaces: a first surface facing the top display panel, a second surface facing the bottom display panel, and a third surface facing the user's respective eye. In some embodiments, polarizing filters may be located between the display panels and the first and second surfaces of the eyepiece. In some embodiments, the first surface of the eyepiece is coated with an S-reflective, P-transmissive material or film, and the second surface of the eyepiece is coated with a P-reflective, S-transmissive material or film. The third surface of the eyepiece may not be coated or may be anti-reflection coated. In some embodiments, a P-polarizing filter is located between the top display panel and the first surface of the eyepiece, and an S-polarizing filter is located between the bottom display panel and the second surface of the eyepiece. P-polarized light has an electric field direction parallel to the plane of incidence on a surface, and S-polarized light has the electric field oriented perpendicular to that plane.

In some embodiments, to display images for viewing by the user, for each eye, a bottom portion of an image is displayed by the top display panel, and a top portion of the image is displayed the bottom display panel. Light from the top display panel passes through the P-polarizing filter and the P-polarized light passes through the first surface of the eyepiece, which is P-transmissive. The P-polarized light strikes the third surface of the eyepiece at an angle so that the light is reflected off the third surface by total internal reflection to the second surface of the eyepiece. The second surface is P-reflective, and the P-polarized light is thus reflected by the second surface to the third surface at an angle so that the light passes through the third surface to form an exit pupil for a bottom portion of an image at a pupil plane at or near the subject's respective eye. At the same time, light from the bottom display panel passes through the S-polarizing filter and the S-polarized light then passes through the second surface of the eyepiece, which is S-transmissive. The S-polarized light strikes the third surface of the eyepiece at an angle so that the light is reflected off the third surface by total internal reflection to the first surface of the eyepiece. The first surface is S-reflective, and the S-polarized light is thus reflected by the first surface to the third surface at an angle so that the light passes through the third surface to form an exit pupil for a top portion of the image at the pupil plane at or near the subject's respective eye. The displayed images are thus projected onto the subject's retina, and form a virtual image, typically one to two meters in front of the subject.

The HMD may include an eye tracking system for detecting position and movements of the user's eyes. The eye tracking system may include at least one eye tracking camera (e.g., near-IR (NIR) cameras) for each eye, and an illumination source (e.g., an NIR light source) that emits light (e.g., NIR light) towards the user's eyes. In some embodiments, at least one eye-tracking camera may be located in front of each eyepiece and between the top and bottom display panels so that the cameras have a direct view of the user's eyes through the eyepieces. Locating the cameras in front of the eyepieces and between the display panels allows the cameras to capture images of the eyes with less keystone distortion than can be captured in conventional HMD eye tracking configurations.

In some embodiments, light sources of the HMD emit NIR light to illuminate the user's eyes. A portion of the NIR light is reflected off the user's eyes and passes through the eyepieces of the HMD to NIR eye tracking cameras, for example located between the top and bottom display panels, to capture images of the user's eyes.

In some embodiments, the eye tracking camera may be located slightly off-center from the center axis of the optical system to avoid artifacts or distortions that may be caused by the conjunction of the first and second surfaces of the eyepiece (which may be referred to as the "apex" of the prism or eyepiece). However, in some embodiments, a second prism may be located at the apex of the eyepiece to at least partially correct for distortions at the apex, and the eye tracking camera may be located in front of the second prism to minimize or eliminate keystone distortion in captured images of the eye. In some embodiments, the second prism is formed of the same optical material (e.g., plastic or glass) as the first prism.

Images captured by the eye tracking system may be analyzed to detect position and movements of the user's eyes, or to detect other information about the eyes such as pupil dilation. For example, the point of gaze on the display estimated from the eye tracking images may enable gaze-based interaction with content shown on the near-eye display of the HMD. Other applications may include, but are not limited to, creation of eye image animations used for avatars in a VR/AR environment.

Figure 1A:
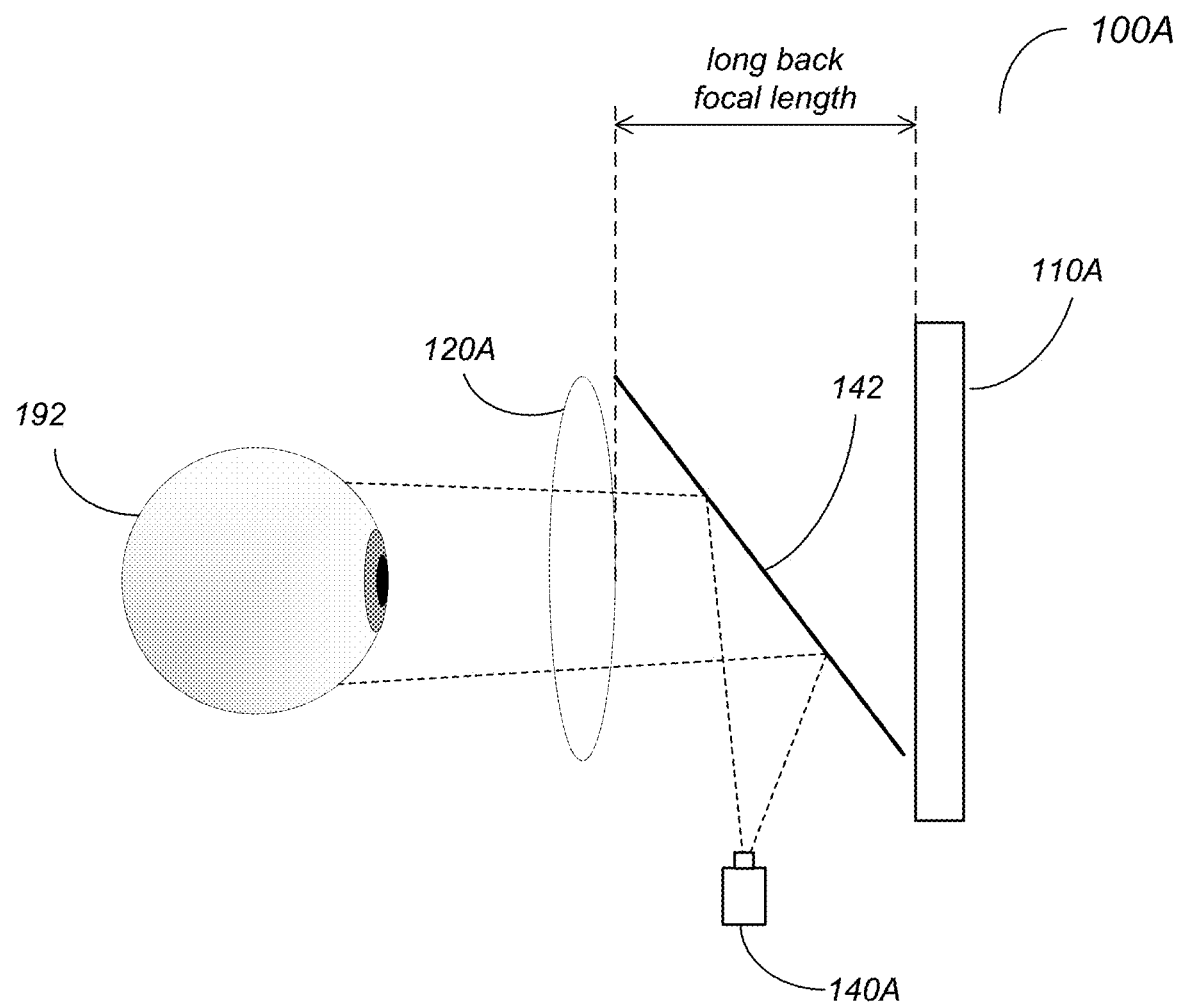
FIGS. 1A through 1C illustrate conventional eye tracking systems for VR/AR head-mounted displays (HMDs).

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for image display and eye tracking in virtual and mixed or augmented reality (VR/AR) applications are described. A VR/AR device such as a headset, helmet, goggles, or glasses (referred to herein as a head-mounted display (HMD)) is described that includes display panels for displaying frames including left and right images to thus provide 3D virtual views to the user. Embodiments may include two or more display panels (e.g., a top display panel and a bottom display panel) for each eye. The HMD may include left and right optical prisms (also referred to herein as eyepieces) located between the displays and the user's eyes. Each eyepiece may be a prism with three surfaces: a first surface facing the top display panel, a second surface facing the bottom display panel, and a third surface facing the user's respective eye. In some embodiments, polarizing filters may be located between the display panels and the first and second surfaces of the eyepiece. In some embodiments, the first surface of the eyepiece is coated with an S-reflective, P-transmissive material or film, and the second surface of the eyepiece is coated with a P-reflective, S-transmissive material or film. The third surface of the eyepiece may not be coated or may be anti-reflection coated. In some embodiments, a P-polarizing filter is located between the top display panel and the first surface of the eyepiece, and an S-polarizing filter is located between the bottom display panel and the second surface of the eyepiece. P-polarized light has an electric field direction parallel to the plane of incidence on a surface, and S-polarized light has the electric field oriented perpendicular to that plane. The displays and eyepieces are configured form virtual images of the top and bottom image content displayed on the displays at a plane in front of the user (typically, 1-2 meters in front of the user). The display images are projected onto the user's retinas by the eyepieces. The exit pupils (the point at which chief rays cross) of the eyepieces are formed at the pupil plane.

The HMD may include an eye tracking system (which may also be referred to as a gaze tracking system) for detecting position and movements of the user's eyes, or for detecting other information about the eyes such as pupil dilation. The point of gaze on the display estimated from the information captured by the eye tracking system may, for example, allow gaze-based interaction with the content shown on the near-eye display. Other applications may include, but are not limited to, creation of eye image animations used for avatars in a VR/AR environment. The eye tracking system may include at least one eye tracking camera (e.g., near-IR (NIR) cameras) for each eye, and an illumination source (e.g., an NIR light source) that emits light (e.g., NIR light) towards the user's eyes. In some embodiments, at least one eye-tracking camera may be located in front of each eyepiece and between the top and bottom display panels so that the cameras have a direct view of the user's eyes through the eyepieces. Locating the cameras in front of the eyepieces and between the display panels allows the cameras to capture images of the eyes with less keystone distortion than can be captured in conventional HMD eye tracking configurations.

In some embodiments, to display images for viewing by the user, for each eye, a bottom portion of an image is displayed by the top display panel, and a top portion of the image is displayed the bottom display panel. Light from the top display panel passes through the P-polarizing filter and the P-polarized light passes through the first surface of the eyepiece, which is P-transmissive. The P-polarized light strikes the third surface of the eyepiece at an angle so that the light is reflected off the third surface by total internal reflection to the second surface of the eyepiece. The second surface is P-reflective, and the P-polarized light is thus reflected by the second surface to the third surface at an angle so that the light passes through the third surface to form an exit pupil for a bottom portion of an image at a pupil plane at or near the subject's respective eye. At the same time, light from the bottom display panel passes through the S-polarizing filter and the S-polarized light then passes through the second surface of the eyepiece, which is S-transmissive. The S-polarized light strikes the third surface of the eyepiece at an angle so that the light is reflected off the third surface by total internal reflection to the first surface of the eyepiece. The first surface is S-reflective, and the S-polarized light is thus reflected by the first surface to the third surface at an angle so that the light passes through the third surface to form an exit pupil for a top portion of the image at the pupil plane at or near the subject's respective eye. The displayed images are thus projected onto the subject's retina, and form a virtual image in front of the subject, typically one to two meters in front of the subject. The top and bottom portions of the image projected onto the retina and of the virtual image formed in front of the subject may, but do not necessarily, overlap.

In some embodiments, light sources of the HMD emit NIR light to illuminate the user's eyes. A portion of the NIR light is reflected off the user's eyes and passes through the eyepieces of the HMD to NIR eye tracking cameras, for example located between the top and bottom display panels, to capture images of the user's eyes.

While embodiments of an eye tracking system for HMDs are generally described herein as including at least one eye tracking camera for each eye to track the gaze of both of the user's eyes, an eye tracking system for HMDs may also be implemented that includes at least one eye tracking camera to track the gaze of only one of the user's eyes.

While embodiments are generally described in which light from a top display is filtered by a P-polarizing filter and light from a bottom display is filtered by an S-polarizing filter, note that the polarizations can be reversed with appropriate adjustments to the eyepiece. Also note that, while embodiments are generally described that include a top and bottom display for each eye, embodiments are possible that include a left and right display for each eye, or more than two displays for each eye, with appropriate adjustments to the optics (e.g., the eyepieces).

Figure 1B:
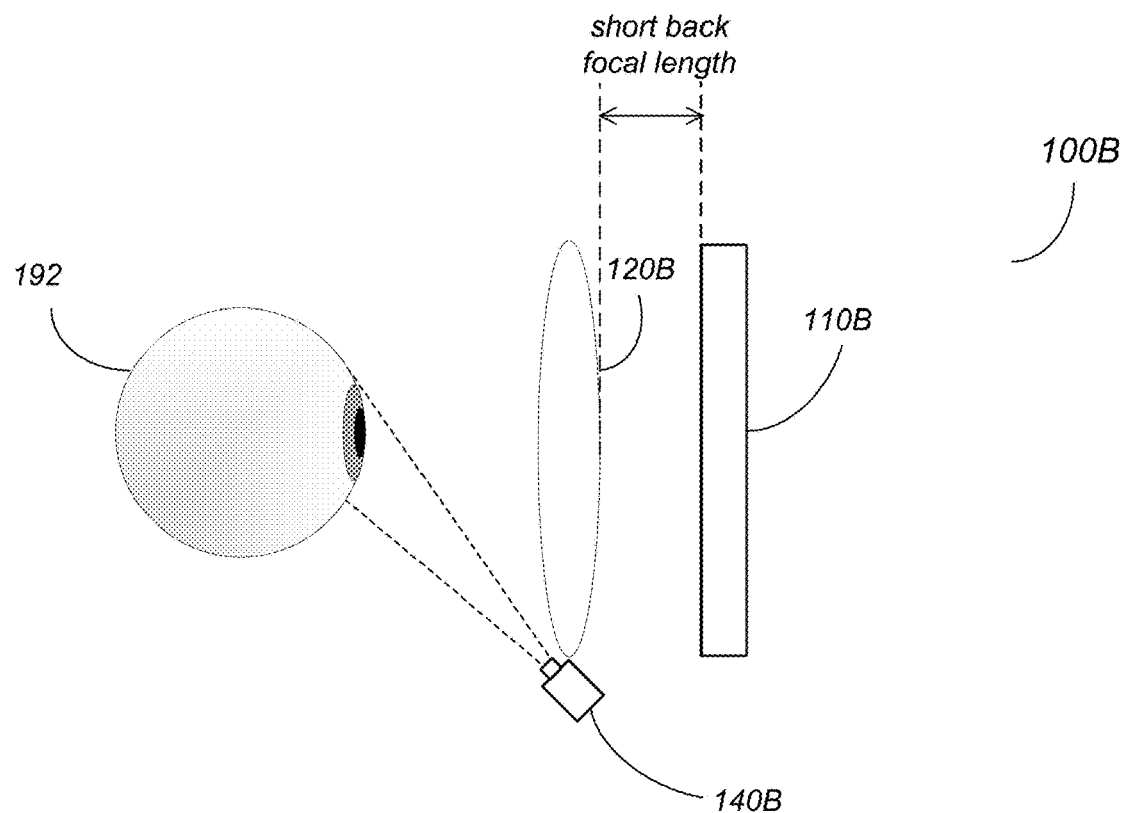
Figure 1C:
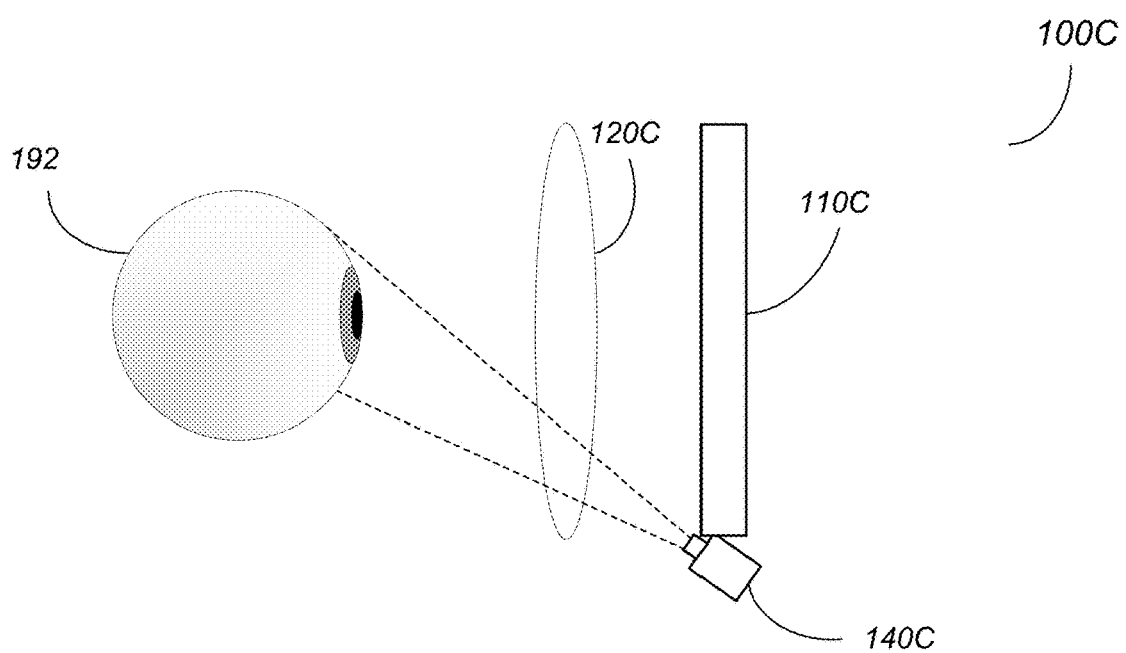

FIGS. 1A through 1C illustrate conventional eye tracking systems for VR/AR HMDs. As shown in FIGS. 1A through 1C, a VR/AR HMD 100 may include a display 110 and two eyepiece lenses 120, mounted in a wearable housing. The user looks through the eyepieces 120 onto the display 110. In some embodiments, the eyepieces 120 form a virtual image of the displayed content at a distance which is typically close to optical infinity of the eyepieces 120. To fit eye tracking cameras 140 into the HMD 100 housing, different camera optical paths have been used.

Referring to HMD 100A of FIG. 1A, the cameras 140A are positioned such that a frontal view of the eyes 192 is captured through the eyepieces 120A. In order to remove the cameras 140 from the user's field of view, hot mirrors 142 are positioned between the eyepieces 120A and the display 110A to fold the camera 140A optical paths away from the visible light display 110A optical paths. NIR light source(s) may be positioned in the HMD 100A (e.g., around the eyepieces 120A, or elsewhere in the HMD 100A) to illuminate the user's eyes 192 with NIR light. However, this configuration requires a long back focal length (distance between the eyepiece 120A and the display 110A) to accommodate the hot mirrors 142. Further, this configuration may provide a relatively small field of view (FOV).

The configurations shown in FIGS. 1B and 1C may provide shorter back focal lengths and larger FOVs. Referring to HMD 100B of FIG. 1B, the cameras 140B do not look through the eyepieces 120B, but view the user's eyes 192 from the side. For this optical path, cameras 140B are typically mounted at the side of the user's nose, the side of the user's face, or on top or bottom of an eyeglass-frame. As a consequence, the cameras 140B do not have a direct frontal view onto the user's eyes 192. Referring to HMD 100C of FIG. 1C, the cameras 140C view the eyes 192 through the eyepieces 120C, but must be mounted to the side of display 110C so that the cameras do not obstruct the user's view of the display 110C through eyepieces 120C. As a consequence, the cameras 140C also do not have a direct frontal view onto the user's eyes 192.

The configurations shown in FIGS. 1A through 1C have advantages and disadvantages. The configuration of FIG. 1A allows a more centered view of the eye, but has a long back focal length to accommodate the hot mirrors and may provide a relatively narrow FOV. The configurations of FIGS. 1B and 1C may provide a shorter back focal length and larger FOV, but the eye tracking cameras may view the eye from a tilted position which may cause reduced detection accuracy of eye features at some gaze angles due to distortion (e.g., keystone distortion), insufficient depth-of-field, and occlusions.

Figure 2:
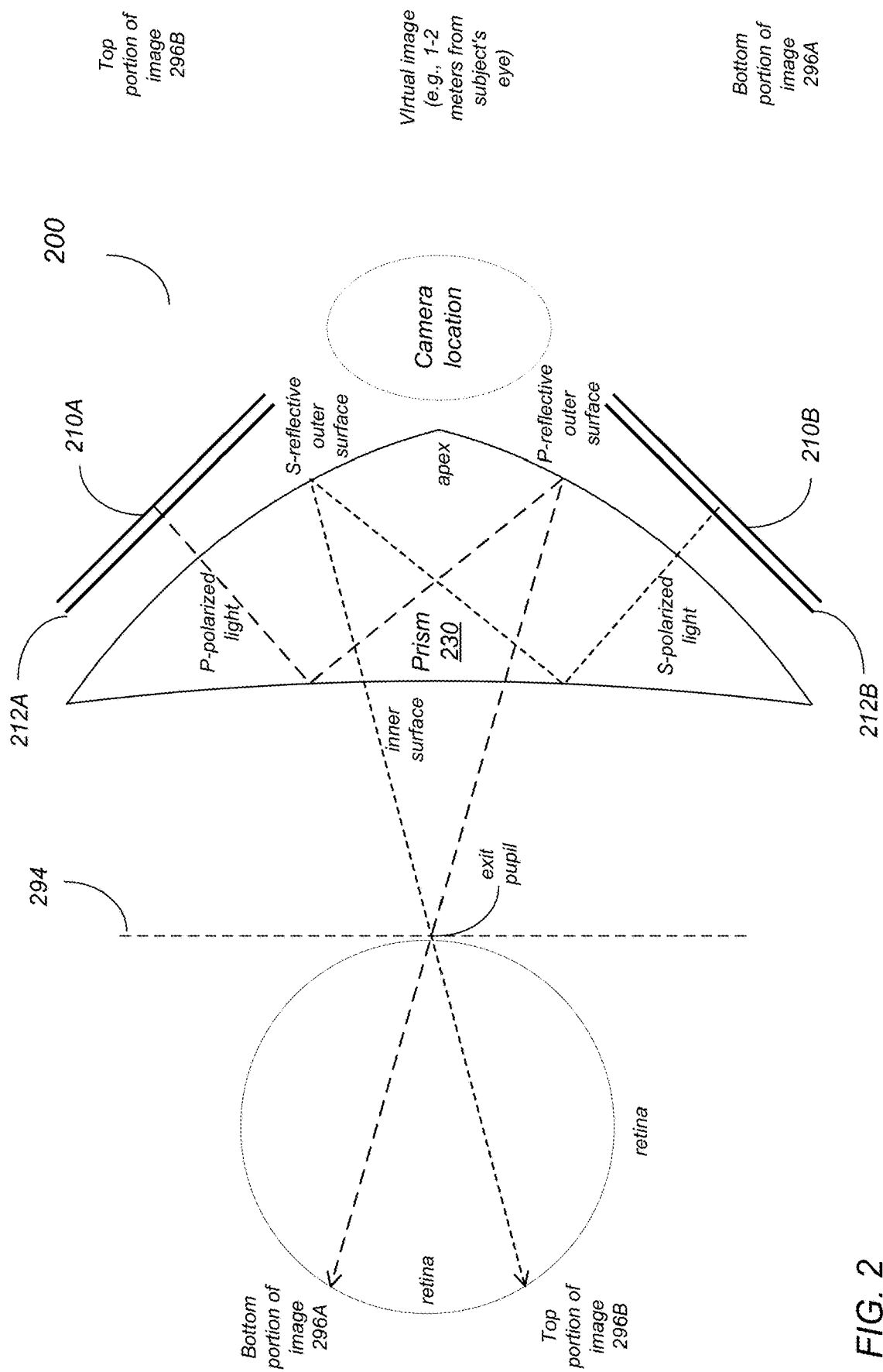
FIG. 2 illustrates an optical system with two display panels per eye that are viewed through a beam-splitting eyepiece, according to some embodiments.

FIG. 2 illustrates an optical system with two display panels per eye that are viewed through a beam-splitting eyepiece, according to some embodiments. FIG. 2 shows a side view of the optical system for one eye. For each eye, VR/AR HMD 200 may include two displays 210A and 210B and an eyepiece (prism 230), mounted in a wearable housing. Prism 230 may include a first surface facing display 210A, a second surface facing display 210B, and a third surface facing the user's eye. The first surface of prism 230 may be coated with an S-reflective, P-transmissive material or film, and the second surface of prism 230 may be coated with a P-reflective, S-transmissive material or film. The third surface of prism 230 may not be coated or may be anti-reflection coated. In some embodiments, a P-polarizing filter 212A is located between the top display panel 210A and the first surface of the prism 230, and an S-polarizing filter 212B is located between the bottom display panel 210B and the second surface of the prism 230.

The conjunction of the first and second surfaces of the prism 220 may be referred to as the "apex" of the prism 220. In some embodiments, the first surface and the second surface are aspherical surfaces and symmetrical with respect to the apex.

In some embodiments, to display images for viewing by the user, for each eye, a bottom portion of an image is displayed by the top display panel 210A, and a top portion of the image is displayed the bottom display panel 210B. Light from the top display panel 210A passes through the P-polarizing filter 212A and the P-polarized light passes through the first surface of the prism 230, which is P-transmissive. The P-polarized light strikes the third (inner) surface of the eyepiece at an angle so that the light is reflected off the third surface by total internal reflection to the second surface of the prism 230. The second surface is P-reflective, and the P-polarized light is thus reflected by the second surface to the third surface at an angle so that the light passes through the third surface to form an exit pupil for a bottom portion 296A of an image at a pupil plane 294 at or near the subject's respective eye. At the same time, light from the bottom display panel 210B passes through the S-polarizing filter 212B, and the S-polarized light then passes through the second surface of the prism 230, which is S-transmissive. The S-polarized light strikes the third surface of the prism 230 at an angle so that the light is reflected off the third surface by total internal reflection to the first surface of the prism 230. The first surface is S-reflective, and the S-polarized light is thus reflected by the first surface to the third surface at an angle so that the light passes through the third surface to form an exit pupil for a top portion 296B of the image at the pupil plane 294 at or near the subject's respective eye. The displayed images are thus projected onto the subject's retina, and form a virtual image in front of the subject, typically one to two meters in front of the subject. The top 296B and bottom 296A portions of the image projected onto the retinal and of the virtual image formed in front of the subject may, but do not necessarily, overlap.

The HMD 200 may include an eye tracking system for detecting position and movements of the user's eyes. The eye tracking system may include at least one eye tracking camera (e.g., a near-IR (NIR) camera) for each eye, and an illumination source (e.g., an NIR light source) that emits light (e.g., NIR light) towards the user's eyes. In some embodiments, at least one eye-tracking camera may be located in front of each prism 230 and between the top 210A and bottom 210B display panels so that the cameras have a frontal view of the user's eyes through the prism 230. Locating the camera(s) in front of the prism 230 and between the display panels 210A and 210B allows the camera(s) to capture images of the eyes with less keystone distortion than can be captured in conventional HMD configurations as shown in FIGS. 1B and 1C, while also providing a wider field of view and shorter back focal length than is provided by the HMD configuration as shown in FIG. 1A.

In some embodiments, the displays 210A and 210B emit light in the visible light range and do not emit light in the NIR range, and thus do not introduce noise in the eye tracking system.

Figure 3:
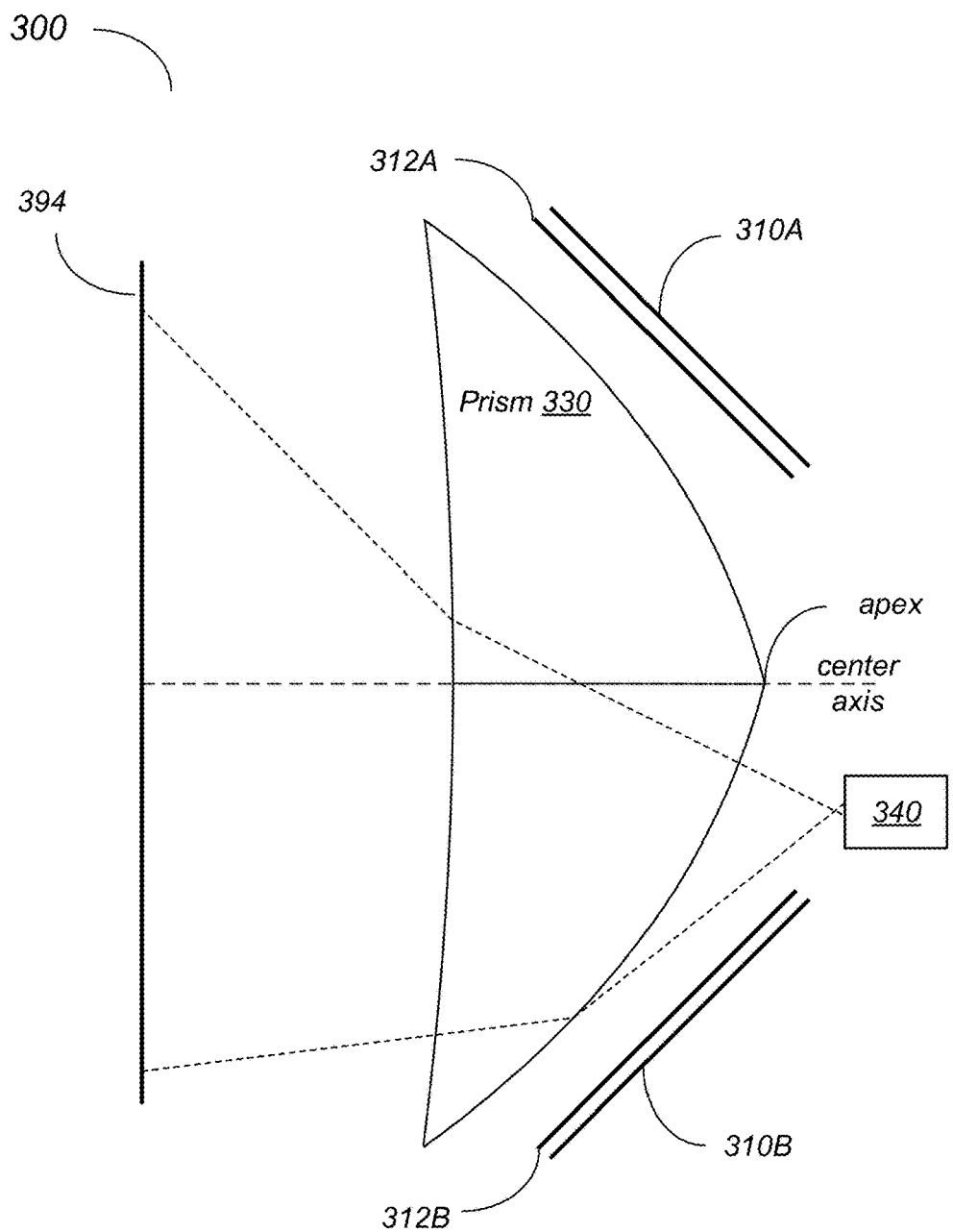
FIG. 3 illustrates locating an eye tracking camera between the display panels and offset from a center axis in the optical system shown in FIG. 2, according to some embodiments.

FIG. 3 illustrates locating an eye tracking camera 340 between the display panels 310A and 310B and offset from a center axis in the optical system shown in FIG. 2, according to some embodiments. In some embodiments, the eye tracking camera 340 may be located between displays 310A and 310B and slightly off-center (to the side, above, or below) from the center axis of the prism 330 to avoid artifacts or distortions that may be caused by the conjunction of the first and second surfaces of the prism 320 (which may be referred to as the "apex" of the prism 320).

Figure 4:
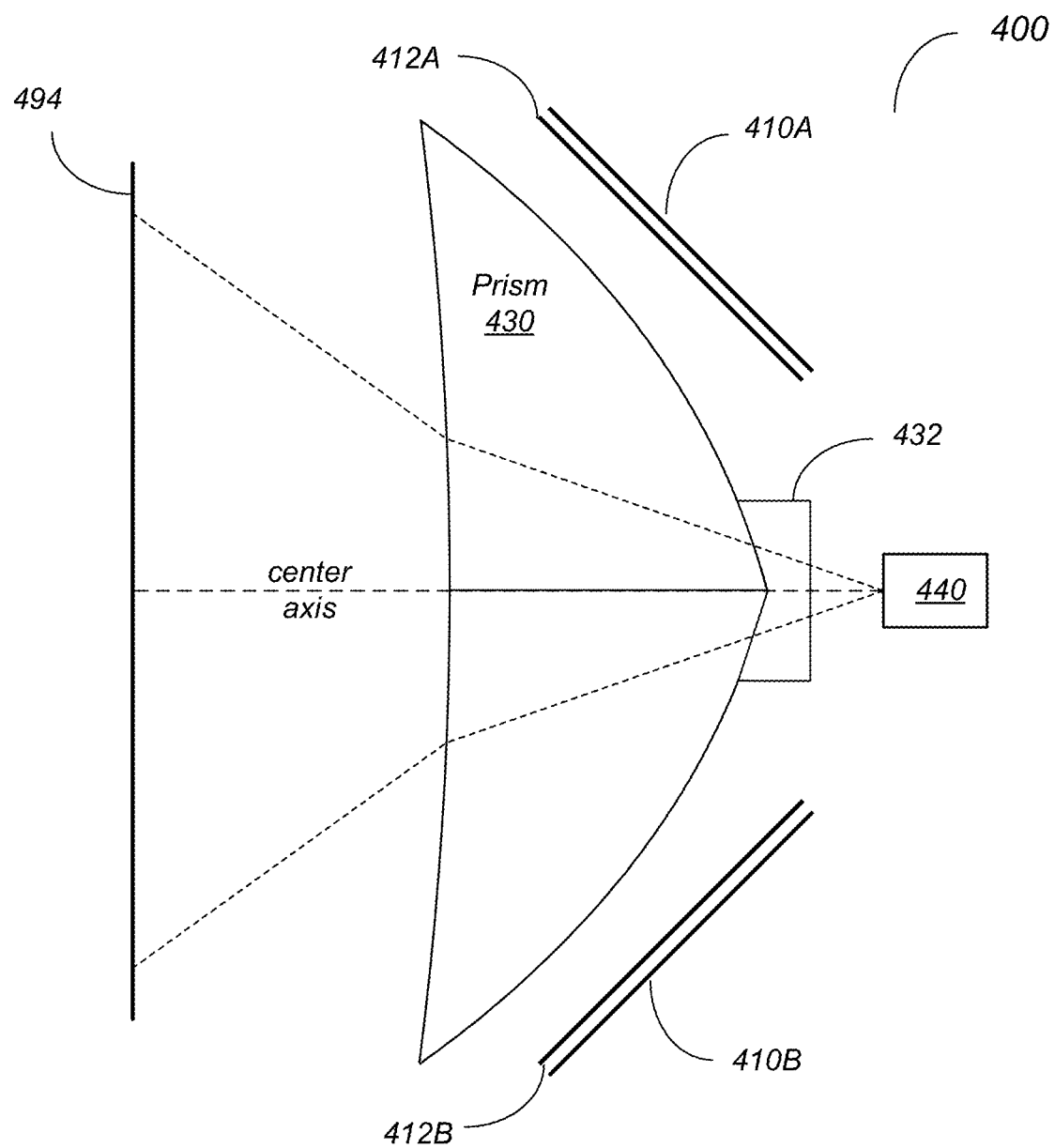
FIG. 4 illustrates including a second prism to correct for distortions at the apex of the eyepiece shown in FIG. 2, according to some embodiments.

FIG. 4 illustrates including a second prism 432 to correct for distortions at the apex of the prism 430 shown in FIG. 2, according to some embodiments. In some embodiments, a second prism may 432 be located at the apex of the prism 430 to at least partially correct for distortions at the apex of prism 430, and the eye tracking camera 440 may be located in front of the second prism 432 and between displays 410A and 410B to minimize or eliminate keystone distortion in captured images of the eye. In some embodiments, the second prism 432 may be attached to the first prism 430 using an optical glue or adhesive. In some embodiments, the second prism 432 is sized so that it does not interfere or block light from the two displays 410A and 410B. In some embodiments, prism 432 is formed of the same optical material (e.g., plastic or glass) as prism 430.

Figure 5:
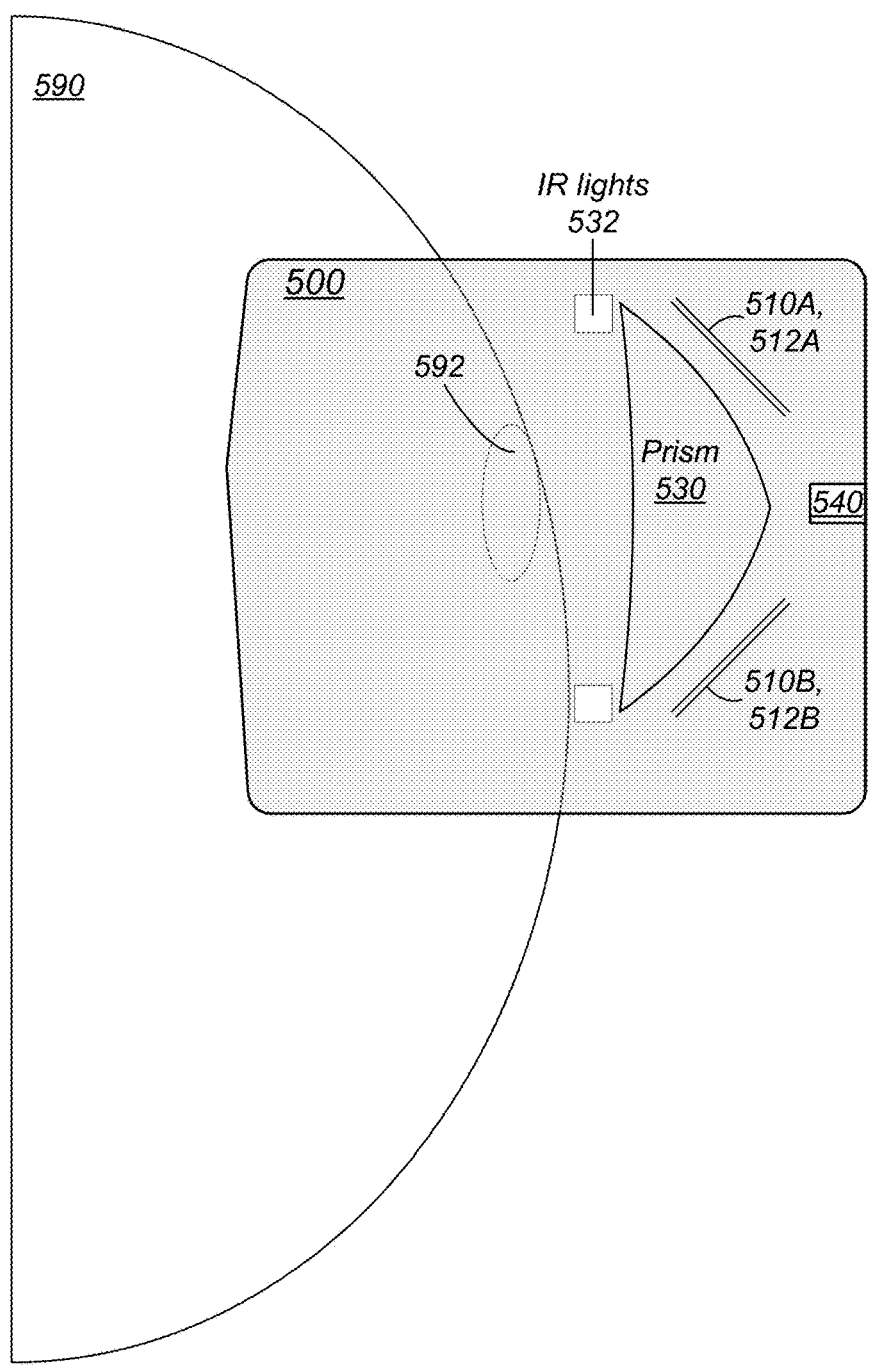
FIG. 5 shows a side view of an example HMD that implements an optical system with eye tracking as illustrated in FIGS. 2 through 4, according to some embodiments.

FIG. 5 shows a side view of an example HMD that implements an optical system with eye tracking as illustrated in FIGS. 2 through 4, according to some embodiments. Note that HMD 500 as illustrated in FIG. 5 is given by way of example, and is not intended to be limiting. In various embodiments, the shape, size, and other features of an HMD 500 may differ, and the locations, numbers, types, and other features of the components of an HMD 500 may vary. The eye tracking system may, for example, be used to track position and movement of the user 590's eyes. In some embodiments, the eye tracking system may instead or also be used to track dilation of the user 590's pupils, or other characteristics of the user 590's eyes. Information collected by the eye tracking system may be used in various VR or AR system functions. For example, the point of gaze may be estimated from images captured by the eye tracking system; the estimated point of gaze may, for example, enable gaze-based interaction with content shown on the displays 510. Other applications of the eye tracking information may include, but are not limited to, creation of eye image animations used for avatars in a VR or AR environment. As another example, in some embodiments, the information collected by the eye tracking system may be used to adjust the rendering of images to be projected, and/or to adjust the projection of the images by the projection system of the HMD 500, based on the direction and angle at which the user 590's eyes are looking. As another example, in some embodiments, brightness of the projected images may be modulated based on the user 590's pupil dilation as determined by the eye tracking system.

As shown in FIG. 5, HMD 500 may be positioned on the user 590's head such that the displays 510 and prisms 530 are disposed in front of the user 590's eyes 592. One or more NIR light source(s) 532 (e.g., NIR LEDs) may be positioned in the HMD 500 (e.g., around the prisms 530, or elsewhere in the HMD 500) to illuminate the user 590's eyes 592 with NIR light. In some embodiments, the NIR light source(s) 532 may emit light at different NIR wavelengths (e.g., 850 nm and 940 nm). At least one eye tracking camera 540 (e.g., an NIR camera, for example a 400×400 pixel count camera, that operates at 850 nm or 940 nm, or at some other NIR wavelength) is located between top and bottom displays 510A and 510B and in front of prism 530. Note that the location and angle of eye tracking camera 540 is given by way of example, and is not intended to be limiting. While FIG. 5 shows a single eye tracking camera 540 located on each side of the user 590's face, in some embodiments there may be two or more NIR cameras 540 on each side of the user 590's face. For example, in some embodiments, a camera 540 with a wider field of view (FOV) and a camera 540 with a narrower FOV may be used on each side of the user's face. As another example, in some embodiments, a camera 540 that operates at one wavelength (e.g. 850 nm) and a camera 540 that operates at a different wavelength (e.g. 940 nm) may be used on each side of the user's face. A portion of NIR light emitted by light source(s) 532 reflects off the user 590's eyes, and passes through prism 530 to the camera(s) 540, and is captured by the cameras 542 to image the user's eyes 592.

Embodiments of the HMD 500 with an eye tracking system as illustrated in FIG. 5 may, for example, be used in augmented or mixed (AR) applications to provide augmented or mixed reality views to the user 590. While not shown, in some embodiments, HMD 500 may include one or more sensors, for example located on external surfaces of the HMD 500, that collect information about the user 590's external environment (video, depth information, lighting information, etc.); the sensors may provide the collected information to a controller (not shown) of the VR/AR system. In some embodiments, the sensors may include one or more visible light cameras (e.g., RGB video cameras) that capture video of the user's environment that may be used to provide the user 590 with a virtual view of their real environment. In some embodiments, video streams of the real environment captured by the visible light cameras may be processed by the controller of the HMD 500 to render augmented or mixed reality frames that include virtual content overlaid on the view of the real environment, and the rendered frames may be provided to the projection system of the HMD 500 for display on display 510.

Embodiments of the HMD 500 with an eye tracking system as illustrated in FIG. 5 may also be used in virtual reality (VR) applications to provide VR views to the user 590. In these embodiments, the controller of the HMD 500 may render or obtain virtual reality (VR) frames that include virtual content, and the rendered frames may be provided to the projection system of the HMD 500 for display on display 510.

Figure 6:
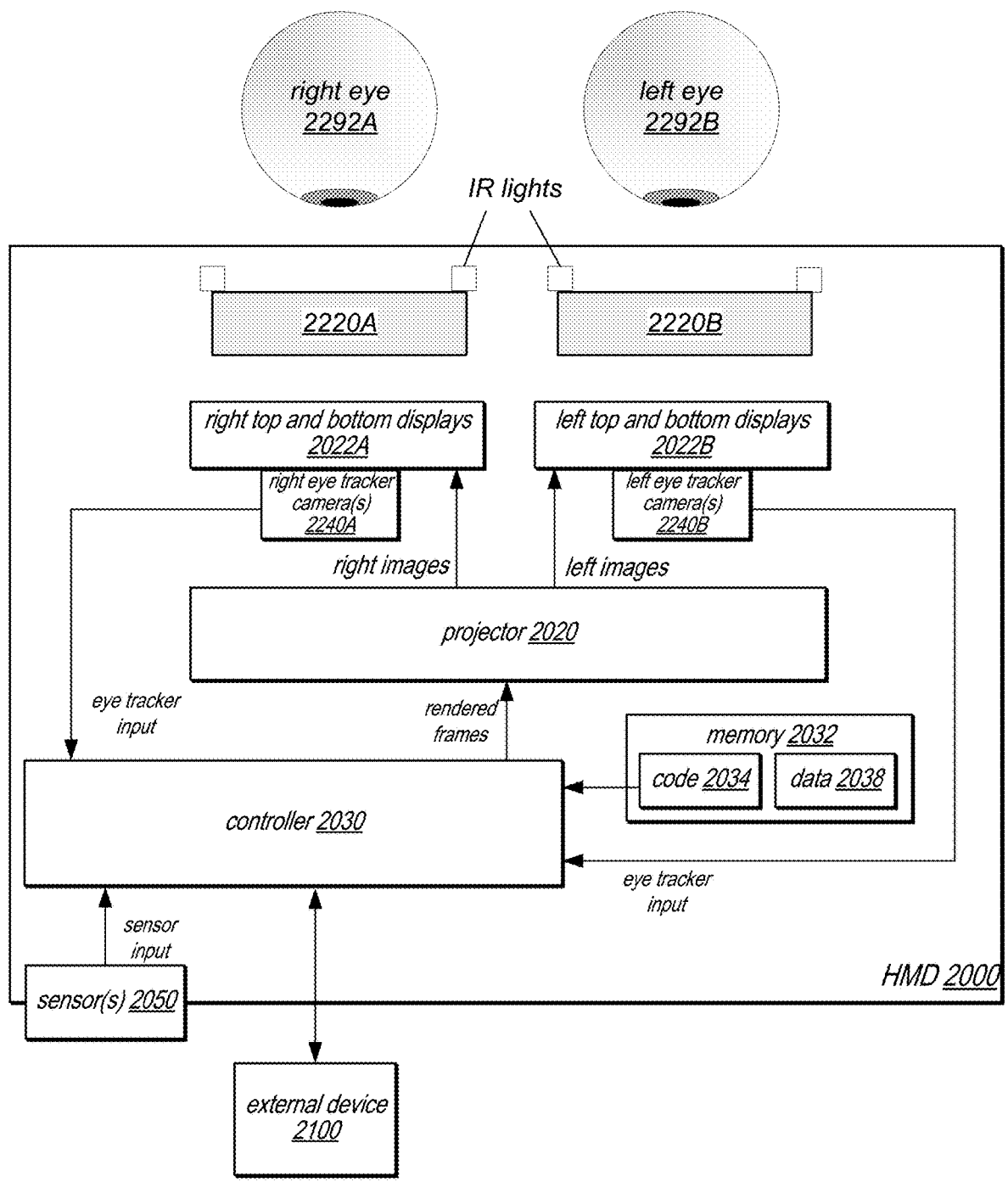
FIG. 6 is a block diagram illustrating components of an example VR/AR system that includes an optical system with eye tracking as illustrated in FIGS. 2 through 4, according to some embodiments.

The controller may be implemented in the HMD 500, or alternatively may be implemented at least in part by an external device (e.g., a computing system) that is communicatively coupled to HMD 500 via a wired or wireless interface. The controller may include one or more of various types of processors, image signal processors (ISPs), graphics processing units (GPUs), coder/decoders (codecs), and/or other components for processing and rendering video and/or images. The controller may render frames (each frame including a left and right image) that include virtual content based at least in part on the inputs obtained from the sensors, and may provide the frames to a projection system of the HMD 500 for display to display 510. FIG. 6 further illustrates components of a HMD and VR/AR system, according to some embodiments.

FIG. 6 is a block diagram illustrating components of an example VR/AR system that includes an optical system with eye tracking as illustrated in FIGS. 2 through 4, according to some embodiments. In some embodiments, a VR/AR system may include an HMD 2000 such as a headset, helmet, goggles, or glasses. HMD 2000 may implement any of various types of virtual reality projector technologies. For example, the HMD 2000 may include a VR projection system that includes a projector 2020 that displays top and bottom portions of frames for left and right images on displays 2022A and 2022B that are viewed by a user through prisms 2220A and 2220B as described in reference to FIGS. 2 through 4. The VR projection system may, for example, be a DLP (digital light processing), LCD (liquid crystal display), or LCoS (liquid crystal on silicon) technology projection system. To create a three-dimensional (3D) effect in a 3D virtual view, objects at different depths or distances in the two images may be shifted left or right as a function of the triangulation of distance, with nearer objects shifted more than more distant objects. Note that other types of projection systems may be used in some embodiments.

In some embodiments, HMD 2000 may include a controller 2030 configured to implement functionality of the VR/AR system and to generate frames (each frame including top and bottom portions of left and right images) that are displayed by the projector 2020. In some embodiments, HMD 2000 may also include a memory 2032 configured to store software (code 2034) of the VR/AR system that is executable by the controller 2030, as well as data 2038 that may be used by the VR/AR system when executing on the controller 2030. In some embodiments, HMD 2000 may also include one or more interfaces (e.g., a Bluetooth technology interface, USB interface, etc.) configured to communicate with an external device 2100 via a wired or wireless connection. In some embodiments, at least a part of the functionality described for the controller 2030 may be implemented by the external device 2100. External device 2100 may be or may include any type of computing system or computing device, such as a desktop computer, notebook or laptop computer, pad or tablet device, smartphone, hand-held computing device, game controller, game system, and so on.

In various embodiments, controller 2030 may be a uniprocessor system including one processor, or a multiprocessor system including several processors (e.g., two, four, eight, or another suitable number). Controller 2030 may include central processing units (CPUs) configured to implement any suitable instruction set architecture, and may be configured to execute instructions defined in that instruction set architecture. For example, in various embodiments controller 2030 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2030 may employ any microarchitecture, including scalar, superscalar, pipelined, superpipelined, out of order, in order, speculative, non-speculative, etc., or combinations thereof. Controller 2030 may include circuitry to implement microcoding techniques. Controller 2030 may include one or more processing cores each configured to execute instructions. Controller 2030 may include one or more levels of caches, which may employ any size and any configuration (set associative, direct mapped, etc.). In some embodiments, controller 2030 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2030 may include one or more other components for processing and rendering video and/or images, for example image signal processors (ISPs), coder/decoders (codecs), etc.

Memory 2032 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 2000 may include one or more sensors 2050 that collect information about the user's environment (video, depth information, lighting information, etc.). The sensors 2050 may provide the information to the controller 2030 of the VR/AR system. In some embodiments, sensors 2050 may include, but are not limited to, visible light cameras (e.g., video cameras).

As shown in FIG. 5, HMD 2000 may be positioned on the user's head such that the displays 2022A and 2022B and prisms 2220A and 2220B are disposed in front of the user's eyes 2292A and 2292B. NIR light sources 2230A and 2230B (e.g., NIR LEDs) may be positioned in the HMD 2000 (e.g., around the prisms 2220A and 2220B, or elsewhere in the HMD 2000) to illuminate the user's eyes 2292A and 2292B with NIR light. Eye tracking cameras 2240A and 2240B (e.g., NIR cameras, for example 400×400 pixel count cameras) are located between right top and bottom displays 2022A and left top and between bottom displays 2022B, respectively. In some embodiments, there may be a single eye tracking camera 2240 for each eye 2292. In some embodiments there may be two or more NIR cameras 2240 for each eye 2292. For example, in some embodiments, a wide-angle camera 2240 and a narrower-angle camera 2240 may be used for each eye 2292. A portion of NIR light emitted by light sources 2230A and 2230B reflects off the user's eyes 2292A and 2292B, passes through prisms 2220A and 2220B, and is captured by the eye tracking cameras 2240A and 2240B to image the user's eyes 2292A and 2292B. Eye tracking information captured by the cameras 2240A and 2240B may be provided to the controller 2030. The controller 2030 may analyze the eye tracking information (e.g., images of the user's eyes 2292A and 2292B) to determine eye position and movement, pupil dilation, or other characteristics of the eyes 2292A and 2292B.

The eye tracking information obtained and analyzed by the controller 2030 may be used by the controller in performing various VR or AR system functions. For example, the point of gaze may be estimated from images captured by the eye tracking cameras 2240A and 2240B; the estimated point of gaze may, for example, enable gaze-based interaction with content shown on the displays 2022A and 2022B. Other applications of the eye tracking information may include, but are not limited to, creation of eye image animations used for avatars in a VR or AR environment. As another example, in some embodiments, the information obtained from the eye tracking cameras 2240A and 2240B may be used to adjust the rendering of images to be projected, and/or to adjust the projection of the images by the projector 2020 of the HMD 2000, based on the direction and angle at which the user's eyes are looking. As another example, in some embodiments, brightness of the projected images may be modulated based on the user's pupil dilation as determined by the eye tracking system.

In some embodiments, the HMD 2000 may be configured to render and display frames to provide an augmented or mixed reality (AR) view for the user at least in part according to sensor 2050 inputs. The AR view may include renderings of the user's environment, including renderings of real objects in the user's environment, based on video captured by one or more video cameras that capture high-quality, high-resolution video of the user's environment for display. The AR view may also include virtual content (e.g., virtual objects, virtual tags for real objects, avatars of the user, etc.) generated by VR/AR system and composited with the projected view of the user's real environment.

Embodiments of the HMD 2000 as illustrated in FIG. 6 may also be used in virtual reality (VR) applications to provide VR views to the user. In these embodiments, the controller 2030 of the HMD 2000 may render or obtain virtual reality (VR) frames that include virtual content, and the rendered frames may be provided to the projector 2020 of the HMD 2000 for display to displays 2022A and 2022B.

Figure 7:
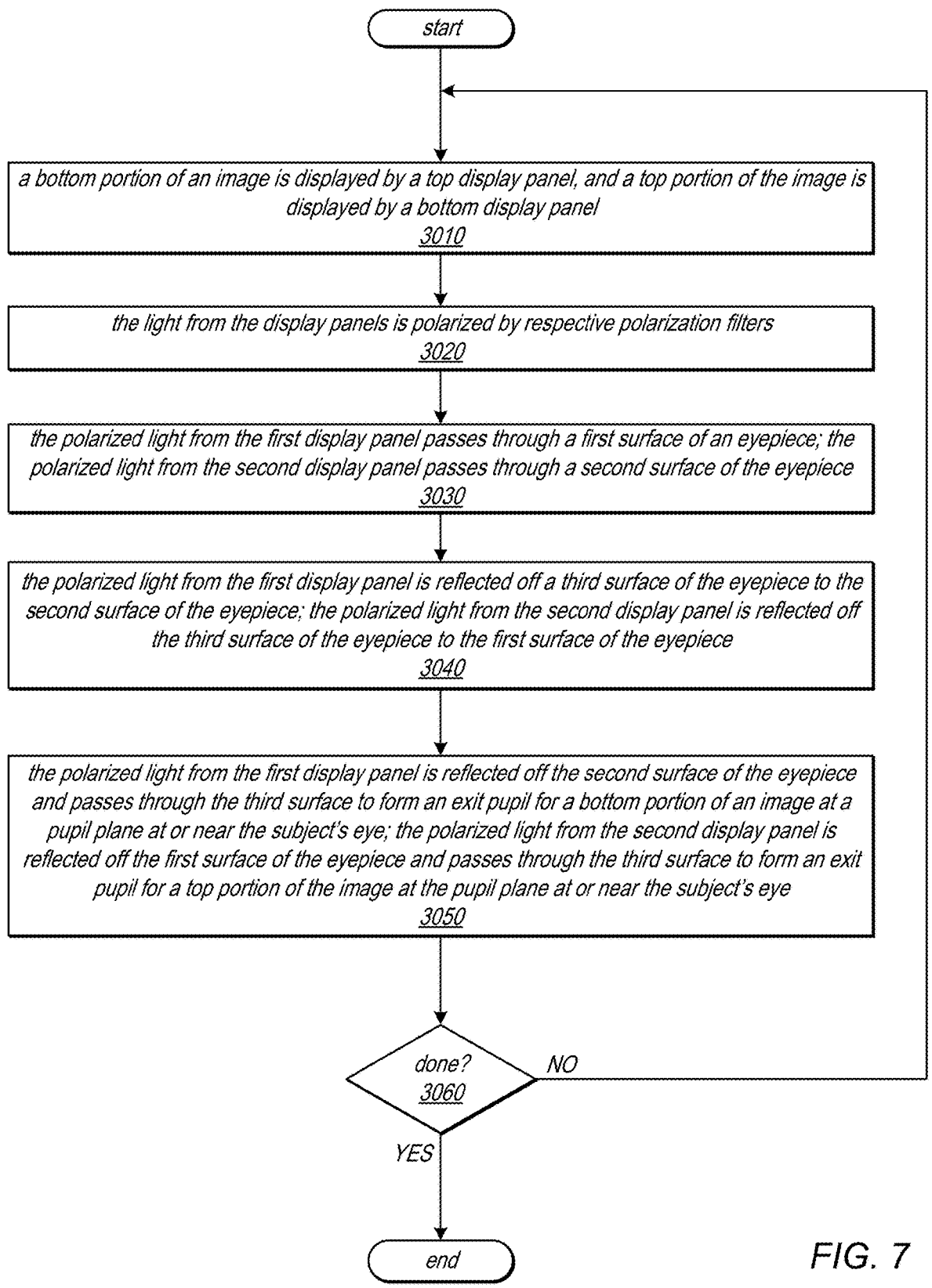
FIG. 7 is a high-level flowchart illustrating a method of operation of an optical system as illustrated in FIGS. 2 through 4, according to some embodiments.

FIG. 7 is a high-level flowchart illustrating a method of operation of an optical system as illustrated in FIGS. 2 through 6, according to some embodiments. As indicated at 3010, a bottom portion of an image is displayed by a top display panel, and a top portion of the image is displayed by a bottom display panel. As indicated at 3020, the light from the display panels is polarized by respective polarization filters. As indicated at 3030, the polarized light from the first display panel passes through a first surface of an eyepiece, and the polarized light from the second display panel passes through a second surface of the eyepiece. In some embodiments, the first surface of the eyepiece is coated with an S-reflective, P-transmissive material or film, and the second surface of the eyepiece is coated with a P-reflective, S-transmissive material or film. A third surface of the eyepiece may not be coated or may be anti-reflection coated. As indicated at 3040, the polarized light from the first display panel is reflected off the third surface of the eyepiece by total internal reflection to the second surface of the eyepiece, and the polarized light from the second display panel is reflected off the third surface of the eyepiece by total internal reflection to the first surface of the eyepiece. As indicated at 3050, the polarized light from the first display panel is reflected off the second surface of the eyepiece and passes through the third surface to form an exit pupil for a bottom portion of an image at a pupil plane at or near the subject's eye, and the polarized light from the second display panel is reflected off the first surface of the eyepiece and passes through the third surface to form an exit pupil for a top portion of the image at the pupil plane at or near the subject's eye. The displayed images are thus projected onto the subject's retina, and form a virtual image in front of the subject, typically one to two meters in front of the subject. The top and bottom portions of the image projected onto the retina and of the virtual image formed in front of the subject may, but do not necessarily, overlap.

Figure 8:
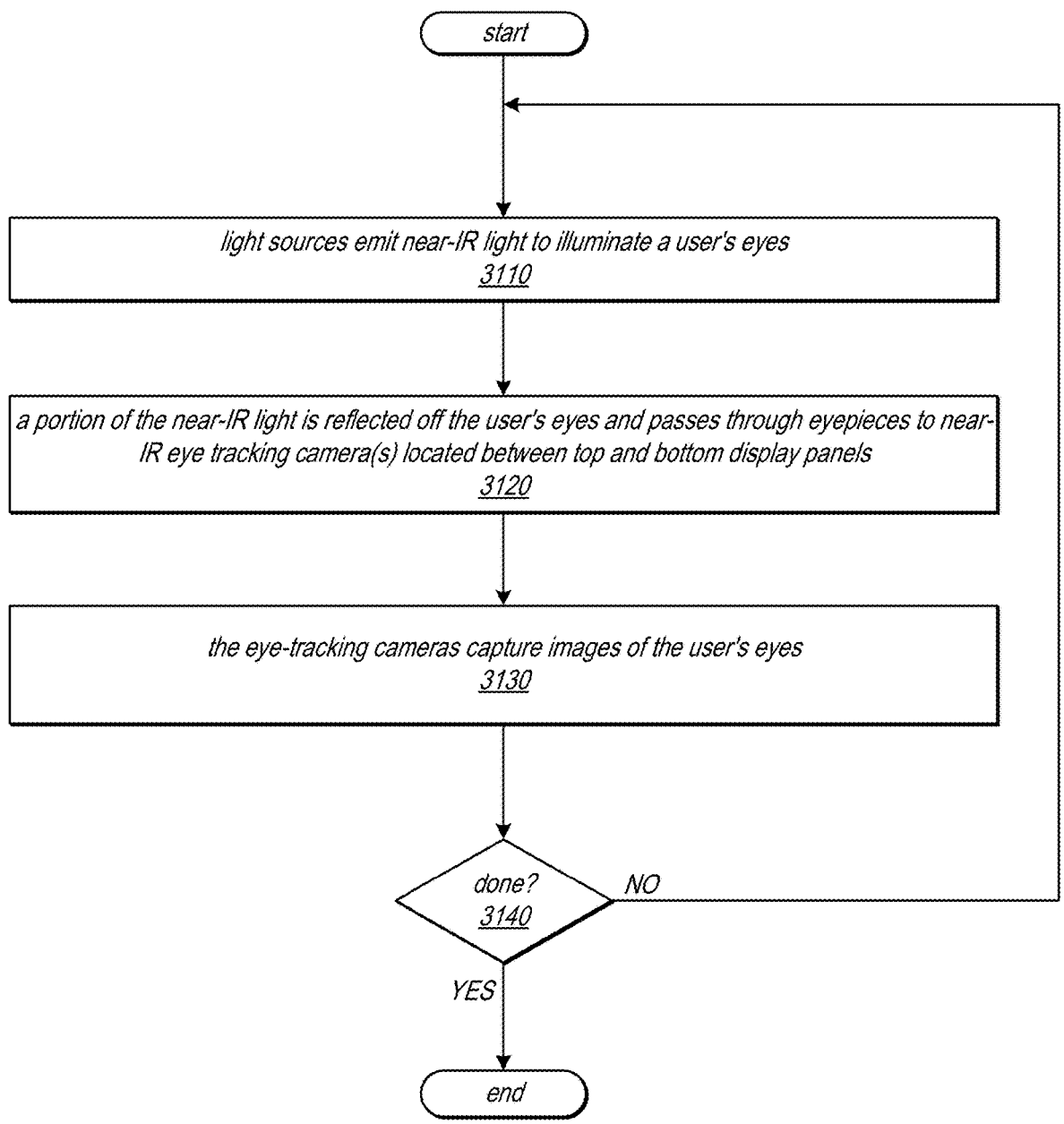
FIG. 8 is a high-level flowchart illustrating a method of operation for eye tracking in an optical system as illustrated in FIGS. 2 through 4, according to some embodiments.

FIG. 8 is a high-level flowchart illustrating a method of operation for eye tracking in an optical system as illustrated in FIGS. 2 through 6, according to some embodiments. As indicated at 3110, light sources of the HMD emit NIR light to illuminate a user's eyes. As indicated at 3120, a portion of the NIR light is reflected off the user's eyes and passes through the eyepieces to near-IR eye tracking camera(s) located between top and bottom display panels. As indicated at 3130, the NIR cameras capture images of the user's eyes. The arrow returning from element 3130 to element 3110 indicates that the eye tracking process may be a continuous process as long as the user is using the HMD.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
    a head-mounted display device comprising:
        for each eye of a user:
            at least two display panels, including a first display panel and a second display panel, configured to display respective portions of an image of content;
            an optical eyepiece comprising a prism located between the at least two display panels and the user's eye that forms a virtual image of the image based at least on a combination of the respective portions of the image displayed on the at least two display panels, wherein the prism includes:
                a first surface that faces the first display panel;
                a second surface that faces the second display panel, wherein a center axis of the prism passes through the apex; and
                a third surface that faces the user's eye; and
            a camera located between the at least two display panels and configured to capture images of the user's eye through the eyepiece.

2. The system as recited in claim 1, wherein the camera is located between the first display panel and the second display panel.

3. The system as recited in claim 1, wherein the system further includes a P-polarizing filter located between the first display panel and a first surface of the prism and an S-polarizing filter located between the second display panel and a second surface of the prism.

4. The system as recited in claim 3, wherein the first surface of the prism is coated with an S-reflective, P-transmissive film, and the second surface of the prism is coated with a P-reflective, S-transmissive film.

5. The system as recited in claim 4,
    wherein P-polarized light from the first display panel passes through the first surface of the prism, is reflected off a third surface of the prism by total internal reflection to the second surface of the prism, is reflected off the second surface of the prism, and passes through the third surface of the prism to form an exit pupil for a first portion of an image at a plane at or near the user's eye; and
    wherein S-polarized light from the second display panel passes through the second surface of the prism, is reflected off the third surface of the prism by total internal reflection to the first surface of the prism, is reflected by the first surface of the prism, and passes through the third surface of the prism to form an exit pupil for a second portion of the image at the plane at or near the user's eye.

6. The system as recited in claim 2, wherein the third surface comprises an anti-reflective coating.

7. The system as recited in claim 6, wherein the first display panel is positioned above the second display panel.

8. The system as recited in claim 1, wherein the camera is located off-center with respect to the center axis.

9. The system as recited in claim 1, wherein the camera is located on the center axis.

10. The system as recited in claim 9, wherein the head-mounted display device further includes, for each eye of the user, a second prism attached to the apex of the prism to correct for distortions of light passing through the prism at or near the apex.

11. The system as recited in claim 10, wherein the second prism is sized so that it does not block light from the first and second display panels.

12. The system as recited in claim 10, wherein the second prism is formed of a same optical material as the prism.

13. The system as recited in claim 7, wherein the first surface and the second surface are aspherical surfaces and symmetrical with respect to the apex.

14. The system as recited in claim 1, further comprising one or more infrared or near-infrared light sources configured to emit infrared or near-infrared light towards the user's face, wherein the camera includes at least one infrared or near-infrared camera that captures a portion of the infrared or near-infrared light reflected off the user's face and through the eyepiece.

15. The system as recited in claim 1, further comprising a controller comprising one or more processors, wherein the controller is configured to:
    obtain images of the user's eyes from the camera for each eye of the user; and
    analyze the images of the user's eyes to determine eye tracking information.

16. The system as recited in claim 15, wherein the eye tracking information comprises a point of gaze of the user's eyes.

17. The system as recited in claim 15, wherein the eye tracking information includes one or more of eye position, eye movement, or pupil dilation.

18. The system as recited in claim 15, wherein the controller is further configured to render the content for display by the at least two display panels.

19. A head-mounted display comprising:
    a first display panel and a second display panel;

a prism located between the display panels and a user's eye, wherein a first surface of the prism faces the first display panel, a second surface of the prism faces the second display panel, and a third surface of the prism faces the user's eye;

wherein the first surface of the prism is coated with an S-reflective, P-transmissive film, and the second surface of the prism is coated with a P-reflective, S-transmissive film;

wherein P-polarized light from the first display panel passes through the first surface of the prism, is reflected off the third surface of the prism by total internal reflection to the second surface of the prism, is reflected off the second surface of the prism, and passes through the third surface of the prism to form an exit pupil for a first portion of an image at a plane at or near the user's eye; and wherein S-polarized light from the second display panel passes through the second surface of the prism, is reflected off the third surface of the prism by total internal reflection to the first surface of the prism, is reflected by the first surface of the prism, and passes through the third surface of the prism to form an exit pupil for a second portion of the image at the plane at or near the user's eye.

20. The head-mounted display as recited in claim 19, further including a P-polarizing filter located between the first display panel and the first surface of the prism and an S-polarizing filter located between the second display panel and the second surface of the prism.

21. The head-mounted display as recited in claim 19, wherein an apex is formed where the first surface and the second surface of the prism meet, and wherein the head-mounted display further includes a second prism attached to the apex of the prism to correct for distortions of light passing through the prism at or near the apex.

22. The head-mounted display as recited in claim 19, further comprising:

a camera located between the first and second display panels and configured to capture images of the user's eye through the prism; and a controller configured to analyze the images of the user's eye captured by the camera to determine eye tracking information, wherein the eye tracking information includes one or more of eye position, eye movement, or pupil dilation.

* * * * *